United States Patent
Eriksson et al.

(10) Patent No.: US 9,751,177 B2
(45) Date of Patent: Sep. 5, 2017

(54) DRIVE ARRANGEMENT IN A PNEUMATIC POWER TOOL

(71) Applicant: ATLAS COPCO INDUSTRIAL TECHNIQUE AB, Stockholm (SE)

(72) Inventors: Ulf Mikael Eriksson, Vallentuna (SE); Wilhelm Mattias Georgsson, Trangsund (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 701 days.

(21) Appl. No.: 14/356,094

(22) PCT Filed: Oct. 25, 2012

(86) PCT No.: PCT/EP2012/071125
§ 371 (c)(1),
(2) Date: May 2, 2014

(87) PCT Pub. No.: WO2013/064416
PCT Pub. Date: May 10, 2013

(65) Prior Publication Data
US 2014/0290974 A1    Oct. 2, 2014

(30) Foreign Application Priority Data

Nov. 4, 2011 (SE) ..................... 1151041

(51) Int. Cl.
*B23Q 5/32* (2006.01)
*F16H 25/12* (2006.01)
(Continued)

(52) U.S. Cl.
CPC .............. *B23Q 5/32* (2013.01); *B23Q 5/326* (2013.01); *B23Q 5/348* (2013.01); *B23Q 5/402* (2013.01);
(Continued)

(58) Field of Classification Search
CPC ........ B23Q 5/326; B23Q 5/348; B23Q 5/402; B23Q 5/32; F16H 25/12; F16H 25/205; F16H 25/2018; F16H 2025/2084
(Continued)

(56) References Cited

U.S. PATENT DOCUMENTS 2,791,922 A * 5/1957 Robinson ............... B23Q 5/326
173/19
3,411,593 A * 11/1968 Quackenbush ........ B23Q 5/326
173/145
(Continued)

FOREIGN PATENT DOCUMENTS

FR 2 918 592 A1 1/2009
GB 2 195 164 A 3/1988

OTHER PUBLICATIONS

International Search Report (ISR) dated Dec. 17, 2012 issued in International Application No. PCT/EP2012/071125.

*Primary Examiner* — Thanh Truong
*Assistant Examiner* — Thomas Wittenschlaeger
(74) *Attorney, Agent, or Firm* — Holtz, Holtz & Volek PC

(57) ABSTRACT

A drive arrangement in a pneumatic power tool includes a pneumatic motor with an output shaft, and a spindle for mounting a cutting element and which externally includes both a thread and an axial groove. A drive rotation of the spindle is driven by a drive gear that is engaged with the axial groove on the spindle and that is drivingly connected to the output shaft so as to rotate at a constant speed with respect to the output shaft. A feed gear is threaded upon the spindle and may be rotated with respect to the spindle in order to advance and retract the spindle. The feed gear is driven by one intermediate feed gear which is interchangeably drivingly connectable to the output shaft via a first and a second gear connection, respectively, so as to advance or retract the spindle.

13 Claims, 7 Drawing Sheets

(51) Int. Cl.
  *B23Q 5/34* (2006.01)
  *B23Q 5/40* (2006.01)
  *F16H 25/20* (2006.01)

(52) U.S. Cl.
  CPC ........... *F16H 25/12* (2013.01); *F16H 25/205* (2013.01); *F16H 25/2018* (2013.01); *F16H 2025/2084* (2013.01)

(58) Field of Classification Search
  USPC .................................................. 408/124, 129
  See application file for complete search history.

(56) References Cited

U.S. PATENT DOCUMENTS

| | | | | |
|---|---|---|---|---|
| 3,583,822 A * | 6/1971 | Alexander | ............ | B23B 45/008 408/11 |
| 3,797,583 A * | 3/1974 | Quackenbush | ....... | B23B 45/008 173/145 |
| 4,453,868 A * | 6/1984 | Winslow | .................. | B23Q 5/06 173/146 |
| 4,591,299 A * | 5/1986 | Eckman | ................. | B23Q 5/326 173/154 |
| 4,592,681 A * | 6/1986 | Pennison | ................ | B23Q 5/326 173/154 |
| 4,681,490 A * | 7/1987 | Pennison | ................ | B23Q 5/326 173/154 |
| 4,822,215 A * | 4/1989 | Alexander | ............ | B23Q 11/04 318/433 |
| 4,850,753 A * | 7/1989 | Dudden | ................. | B23Q 5/326 173/19 |
| 4,854,786 A * | 8/1989 | Alexander | ......... | G05B 19/4163 408/1 R |
| 4,890,962 A * | 1/1990 | Nydegger | ................ | B23Q 5/32 408/103 |
| 4,932,814 A * | 6/1990 | York | ....................... | B23B 29/02 29/26 B |
| 5,022,800 A * | 6/1991 | Vindez | ................... | B23Q 5/326 173/19 |
| 5,054,968 A * | 10/1991 | Eckman | ................. | B23B 49/02 408/129 |
| 5,351,797 A * | 10/1994 | Lawson | ................. | B23Q 5/326 173/19 |
| 6,343,900 B1 * | 2/2002 | Bruno | ....................... | B23Q 5/08 408/124 |
| 2006/0018724 A1 * | 1/2006 | Oehninger | ............. | B23B 35/00 408/124 |

\* cited by examiner

DRIVE ARRANGEMENT IN A PNEUMATIC POWER TOOL

The invention relates to a drive arrangement in a pneumatic power tool. In particular, the invention is related to an advanced drilling equipment (ADE) adapted to perform multiple consecutive drilling operations in an automated manner.

BACKGROUND

A conventional pneumatic power tool comprises a spindle with a socket into which a drill bit may be inserted. The spindle is conventionally driven by two separate gears, which are normally arranged as sleeves coaxially around the spindle. A first gear, the drive gear, is arranged in axial splines in order to drive the rotation of the spindle. The second gear, the feed gear, is threaded onto the spindle such that the mutual rotation between the feed gear and the spindle creates an axial movement there between that feeds the spindle in an axial direction. The feed gear may be geared so as to either advance or retract spindle.

Conventionally, the spindle is advanced in that the threaded feed gear rotates at a slightly higher rotational speed than the spindle. When the drilling operation is concluded the feed gear is positioned into an angularly blocked position. Thereby, as the feed gear is blocked from rotation, the continued rotation of the spindle with respect to the feed gear will rapidly retract the spindle back to its initial position.

A problem inherent in such conventional pneumatic power tools is that the spindle and/or the gear that feeds the spindle might get jammed due to the relatively high rotational speed of the spindle and the gears. This is troublesome not only because it implies that the jammed part needs to be loosened, but also because the parts of the tool will be exposed to heavy stress and wear.

PRIOR ART

In U.S. Pat. No. 2,791,922 a power operated tool with a positively controlled power feed is described. In this power tool the spindle includes an internal groove connected via a splined coupling to a drive shaft arranged coaxially inside the spindle for driving the rotation thereof. Further, the spindle includes an external thread to which a correspondingly threaded sleeve for feeding the spindle back and forth is arranged.

A drawback with the arrangement disclosed in U.S. Pat. No. 2,791,922 is that the length of the internal drive shaft and the external threaded sleeve needs to be at least as long as the possible advancement of the spindle. Further, the arrangement may not be adapted to other advancement lengths, without having to exchange the spindle, the internal drive shaft and the external threaded sleeve.

Another power tool is described in FR 2 918 592. In this power tool the spindle is driven angularly by a spline coupled drive gear and axially fed by a threaded feed gear. Both gears are arranged coaxially outside the spindle. The threaded feed gear is connectable to the motor via two different gear ratios; one at which the threaded feed gear rotates faster than the spindle such that the spindle is advanced, and one at which the threaded feed gear rotates slower than the spindle such that the spindle is retracted.

In order to achieve said two gear ratios the threaded feed gear is furnished with two interspaced cog wheel transmissions. Therefore, the threaded feed gear extends over a relatively wide portion of the spindle. With respect to the arrangement disclosed in U.S. Pat. No. 2,791,922 the power tool that is described in FR 2 918 592 presents an advantage in that it is more flexible to the advancement of the spindle.

Both arrangements do however include the drawback that the joint length of the means for driving and feeding the spindle extends over an important extension of the spindle. This implies that the effective length of the spindle is limited and that the head of the tool needs to be relatively long in order to house the spindle. As these tools are utilized in sometimes very limited space it is important to keep length of the head as short as possible.

SUMMARY OF THE INVENTION

An object of the invention is to provide a pneumatic power tool with a more compact functional design.

A further object of the invention is to provide a power tool with a jam free construction, in which the rotational speed of the spindle may be kept at relatively high level without jeopardizing the function of the tool.

The invention relates to a drive arrangement in a pneumatic power tool comprising a pneumatic motor, wherein the drive arrangement comprises a spindle for mounting a cutting element, which spindle is drivingly connected to said motor, and which spindle externally includes both a thread and an axial groove, wherein the drive rotation of the spindle is driven by a drive gear that is engaged with the axial groove on the spindle and drivingly connected to the motor so as to rotate at a constant speed with respect to the motor output shaft, and wherein a feed gear is threaded upon said spindle, which feed gear may be rotated with respect to the spindle in order to advance and retract said spindle. The feed gear is driven by an intermediate feed gear, which intermediate feed gear is interchangeably drivingly connectable to the motor via a first and a second gear connection, respectively, wherein the intermediate feed gear is arranged to advance the spindle with respect to the feed gear in the first gear connection, and to retract the spindle with respect to the feed gear in the second gear connection.

With the arrangement according to the invention the active length of the spindle may be substantially increased with respect to the prior art. This is due to the fact that the joint length of the drive gear and the feed gear is greatly reduced by the inventive arrangement, in which the feed gear is interconnected to an intermediate feed gear which in turn is interchangeably drivingly connectable to the motor output shaft.

In one embodiment of the invention an intermediate drive gear is drivingly connected to the motor and journalled around a first gear shaft to rotate freely with respect to the first gear shaft, which intermediate drive gear is in toothed engagement with the drive gear, and wherein the intermediate feed gear is in toothed engagement with the feed gear and is lodged to slide coaxially along said gear shaft between a first gear position in which it is engaged to the first gear shaft and a second gear position in which it is engaged to the intermediate drive gear, wherein the first and second gear position of the intermediate feed gear correspond to the first and second gear connection, respectively.

In another embodiment of the invention a second gear shaft is arranged to drive the intermediate drive gear via a direct engagement, and to drive the first gear shaft via separate coupling parts, wherein the first gear shaft is arranged to rotate at a higher rotational speed than the intermediate drive gear.

In a further embodiment of the invention the separate coupling parts comprises a clutch sleeve, which is rotationally engaged to the second gear shaft and lodged to slide coaxially along the same, which clutch sleeve is spring loaded by means of a torque limiting spring with a spring action towards a smoothly toothed engagement with a second coupling that in turn is drivingly engaged with a first coupling of the first gear shaft, and wherein said smoothly toothed engagement will be broken if the torque acting between the clutch sleeve and the second coupling exceeds a threshold torque value defined by the spring action on the clutch sleeve.

In yet another embodiment of the invention the driving engagement between the first coupling and the second coupling is achieved by an exchangeable feed cassette including a primary feed cassette gear and an interconnected secondary feed cassette gear, and wherein a first gear ratio may be achieved by engaging the primary feed cassette gear to the first coupling and the secondary feed cassette gear to the second coupling, and a second different gear ratio may be achieved by engaging the primary feed cassette gear to the second coupling and the secondary feed cassette gear to the first coupling.

In another embodiment of the invention a retraction spring is arranged to push the intermediate feed gear into the second gear position in which it is engaged with the intermediate drive gear, and wherein a pneumatic pressure may be arranged in a sealed chamber to act in the opposite direction on the intermediate feed gear to push it into the first gear position in which it is engaged with the first gear shaft and not with the intermediate drive gear, the pneumatic pressure being adapted to override the action of the retraction spring when applied.

Further, the clutch sleeve may be pneumatically connected to the chamber in such a way that the movement of the clutch sleeve when it slides against the action of the torque limiting spring and its smoothly toothed engagement with the second coupling part is broken, will release the pressure in the chamber, whereby the intermediate feed gear will slide out of the first gear position in which it is engaged with the first gear shaft and into the second gear position in which it is engaged with the intermediate drive gear.

In another embodiment of the invention the intermediate feed gear is axially connected to a cylinder via a bearing, which cylinder is lodged to slide coaxially along the first gear shaft and is acted on by the retraction spring and in the opposite direction by the pressure in the pressure chamber, and wherein the axial position of the intermediate feed gear is directly governed by the position of the cylinder and indirectly by the action of the retraction spring and the pressure in the chamber acting on the cylinder.

Further, the engagement between the intermediate feed gear and the intermediate drive gear is achieved by means of a smoothly toothed engagement which is held together by the action of the retraction spring.

In another embodiment of the invention a retaining mechanism is arranged to restrict the intermediate feed gear from moving out of the engagement to the intermediate drive gear during the initial phase of the retraction of the spindle.

In yet another embodiment of the invention the position of the cylinder is pneumatically connected to a control unit of the tool, and wherein the cylinder will produce a pneumatic signal to the control unit to interrupt the operation when the smoothly toothed engagement between the intermediate feed gear and the intermediate drive gear is broken and the cylinder slides against the action of the retraction spring.

Further the control unit may be arranged to transmit a signal to close the main valve of the tool in response to the order to interrupt the operation.

The invention also relates to a pneumatic power tool comprising a pneumatic motor and a drive arrangement as described above.

Further objects and advantages of the invention will appear from the following specification and claims.

SHORT DESCRIPTION OF THE DRAWINGS

In the following detailed description reference is made to the accompanying drawings, of which:

FIG. 4b shows a close up view of the view shown in FIG. 4a;

DETAILED DESCRIPTION OF ONE EMBODIMENT OF THE INVENTION

Figure 1:
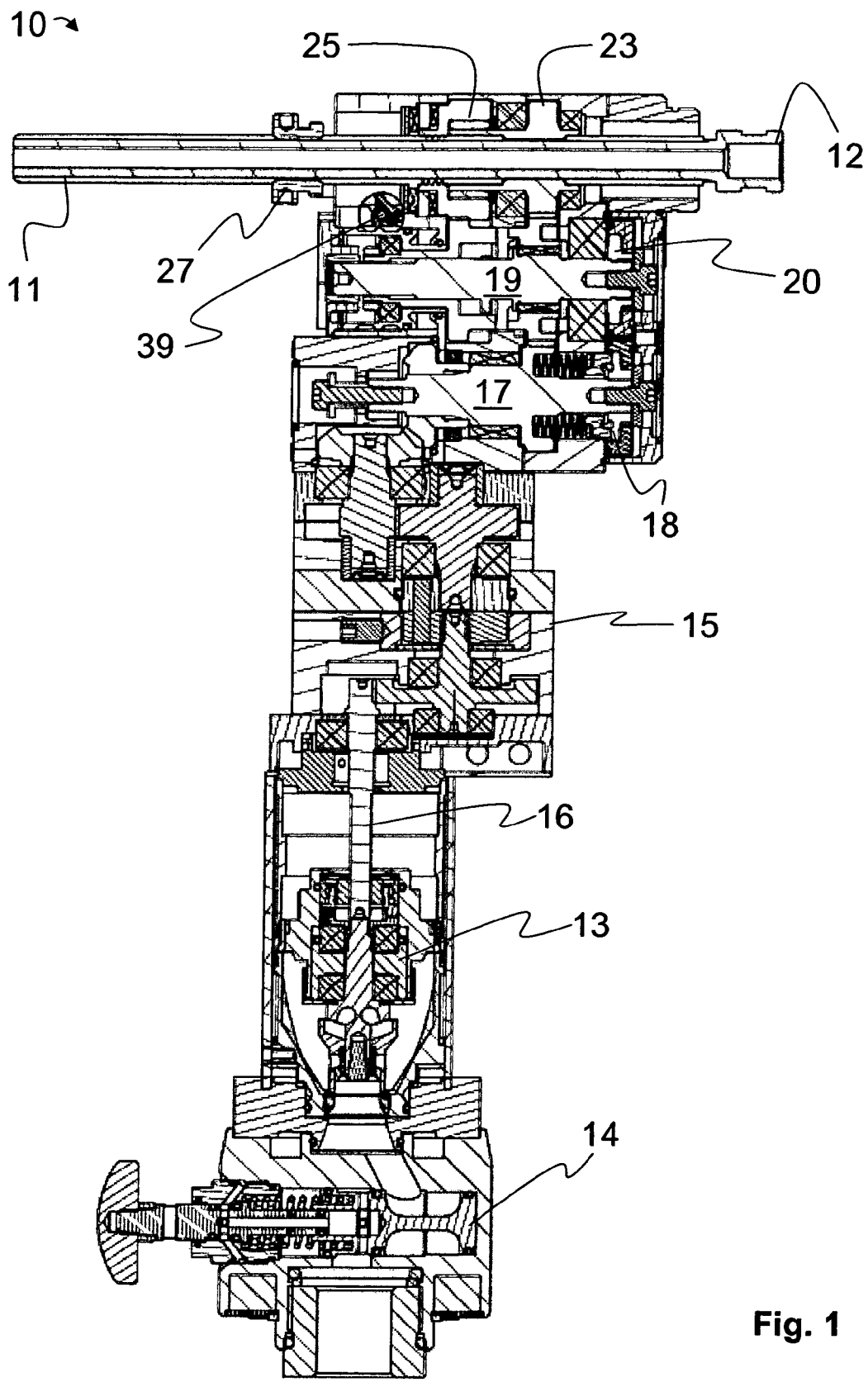
FIG. 1 shows a power tool according to a first embodiment of the invention.

FIG. 1 shows a view of an embodiment of a pneumatic power tool 10 according the invention.

The power tool 10 includes a spindle 11, which is arranged to hold a cutting element, such as e.g. a drill bit (not shown), and to rotate and advance said drill bit. The drill bit is to be arranged in a socket 12 at the right, front end of the spindle 11. A pneumatic motor 13 is arranged in the lower part of the power tool in order to provide the torque to rotate and advance the spindle 11.

The pneumatic motor 13 may be either a turbine motor or a vane motor. In the shown embodiment, the motor is a turbine motor. The motor is driven by compressed air of a pressure of about 6.3 bars. The air is introduced into the motor via a main valve 14.

The motor 13 further includes a motor output shaft 16, which is geared down by means of a gear box 15 to a second gear shaft 17, which is coupled via couplings 18 and 20 to a first gear shaft 19.

The rotation of the second gear shaft 17 is transmitted to the spindle 11 via a drive gear 23. A feed gear 25 is arranged to feed the spindle forward and backward. The arrangement is described in detail below with reference to the detailed view as presented in FIGS. 2-6.

Figure 4A:
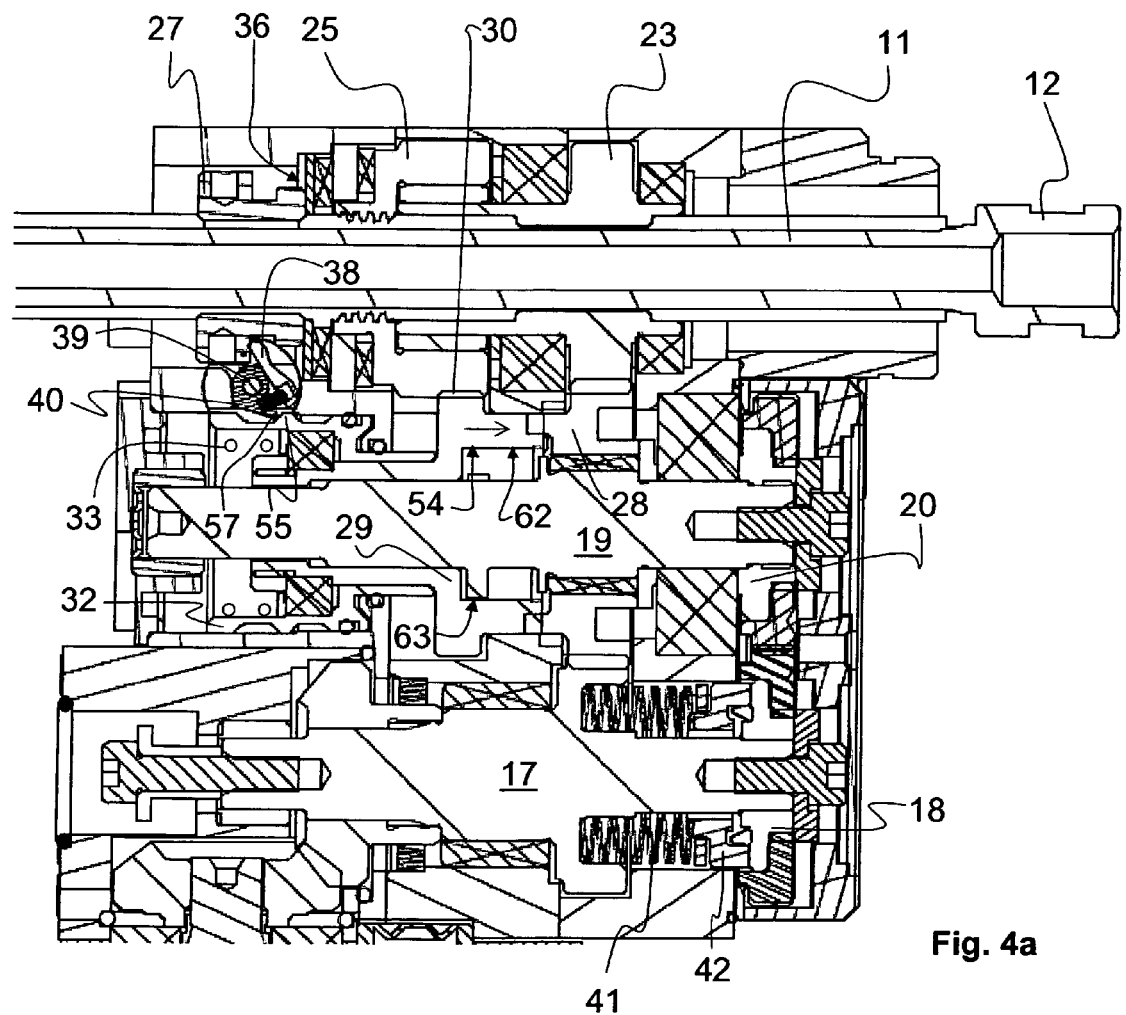
FIG. 4a shows a detailed view of the power tool shown in FIG. 1 in a third operational position.
Figure 4B:
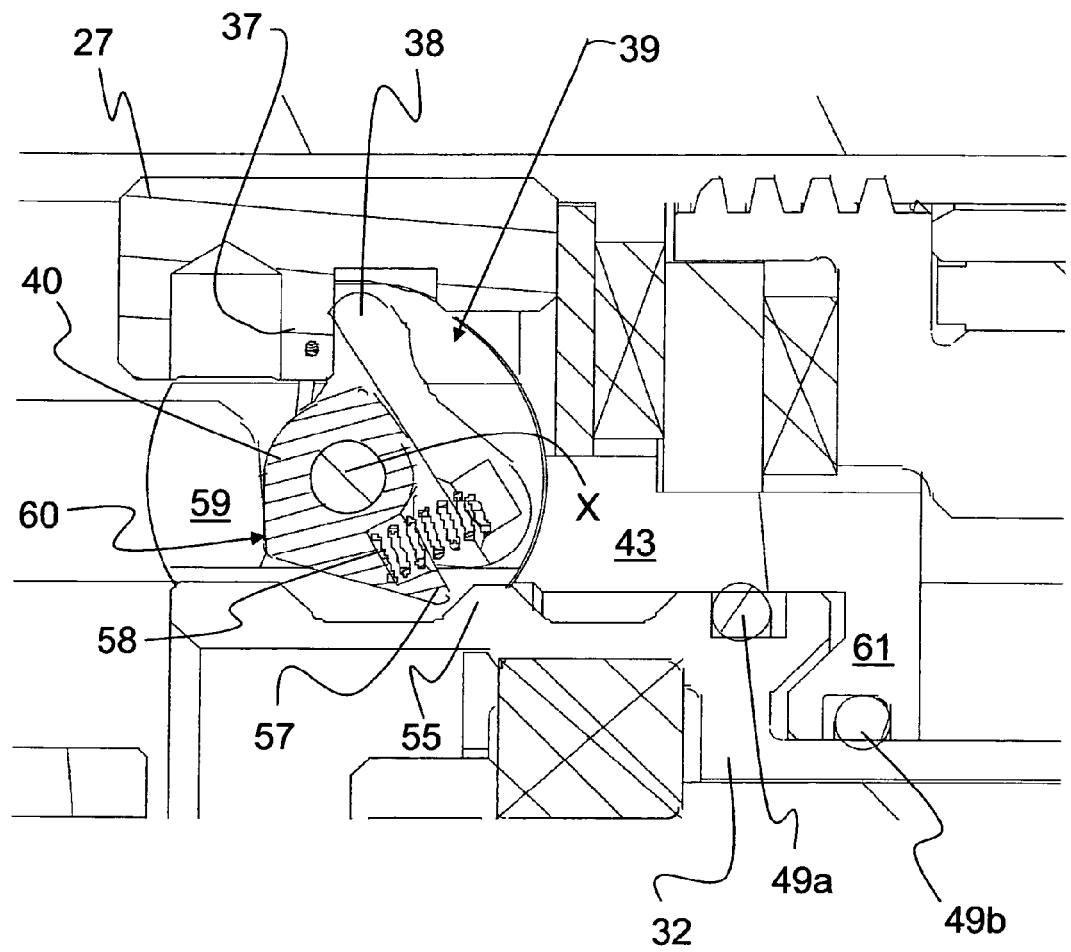
Figure 5:
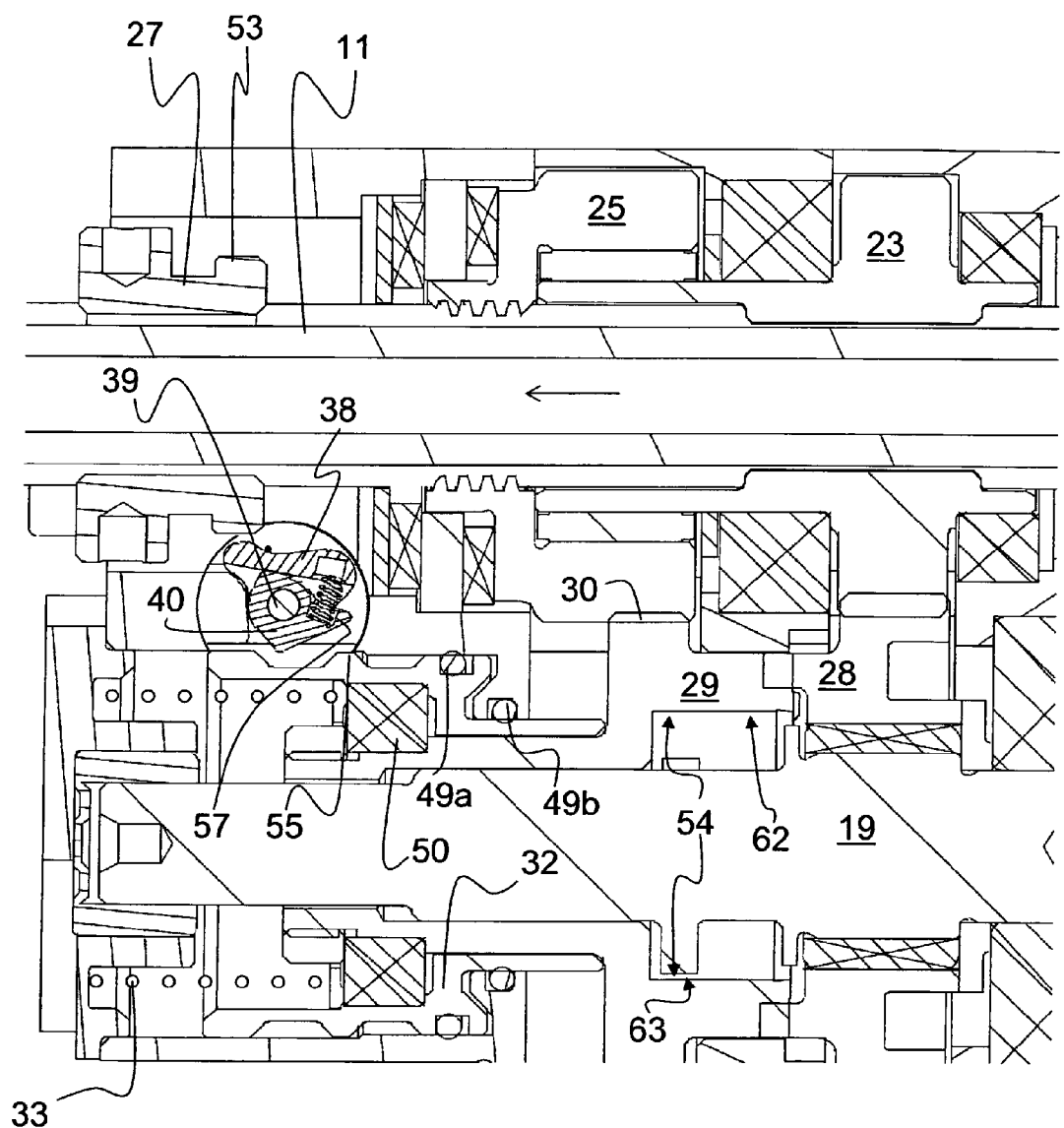
FIG. 5 shows a detailed view of the power tool shown in FIG. 1 in a fourth operational position.
Figure 6:
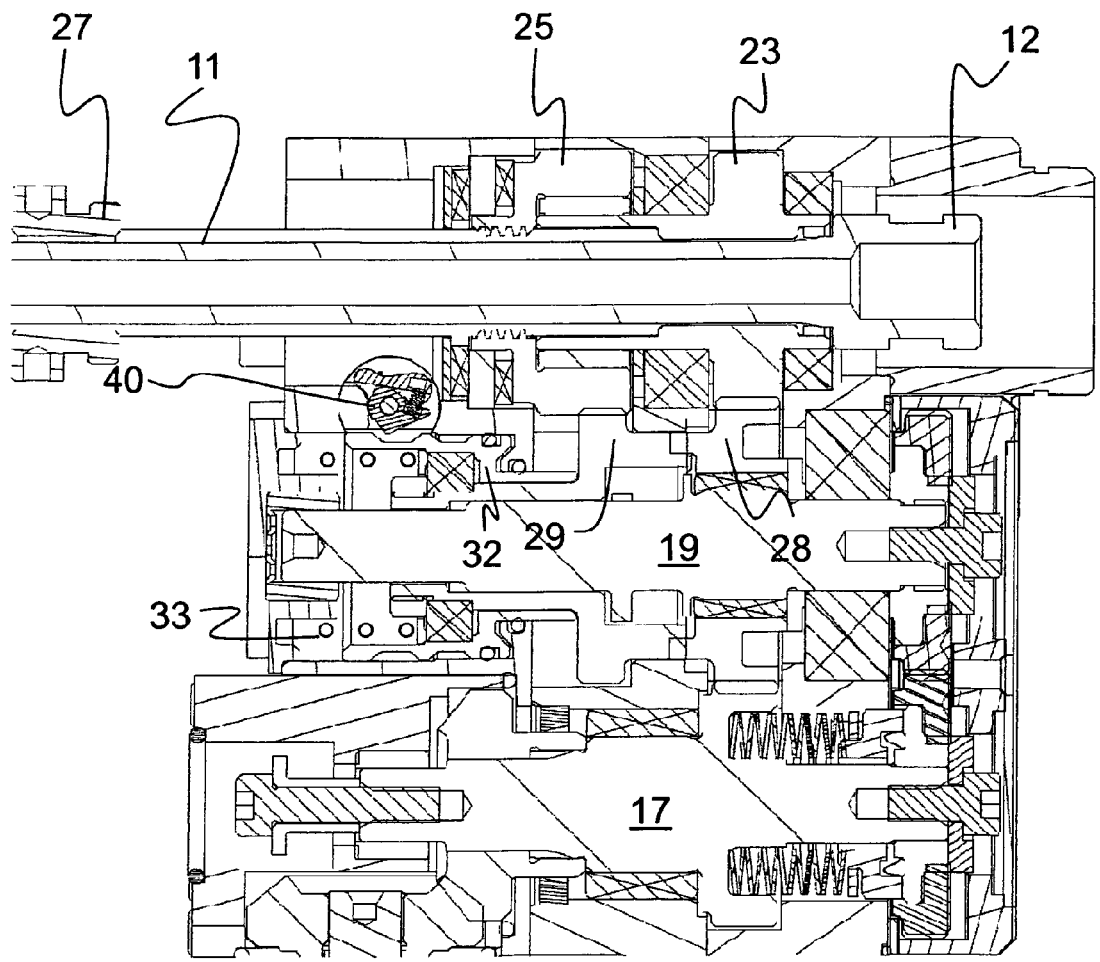
FIG. 6 shows a detailed view of the power tool shown in FIG. 1 in a fifth operational position.

FIGS. 2-6 show an embodiment of a pneumatic power tool according the invention in five different operational modes; normal drilling operation (FIG. 2), end phase of the normal drilling operation (FIG. 3), start of retraction of spindle (FIG. 4), retraction operation (FIG. 5), and the end of retraction operation (FIG. 6).

Figure 2:
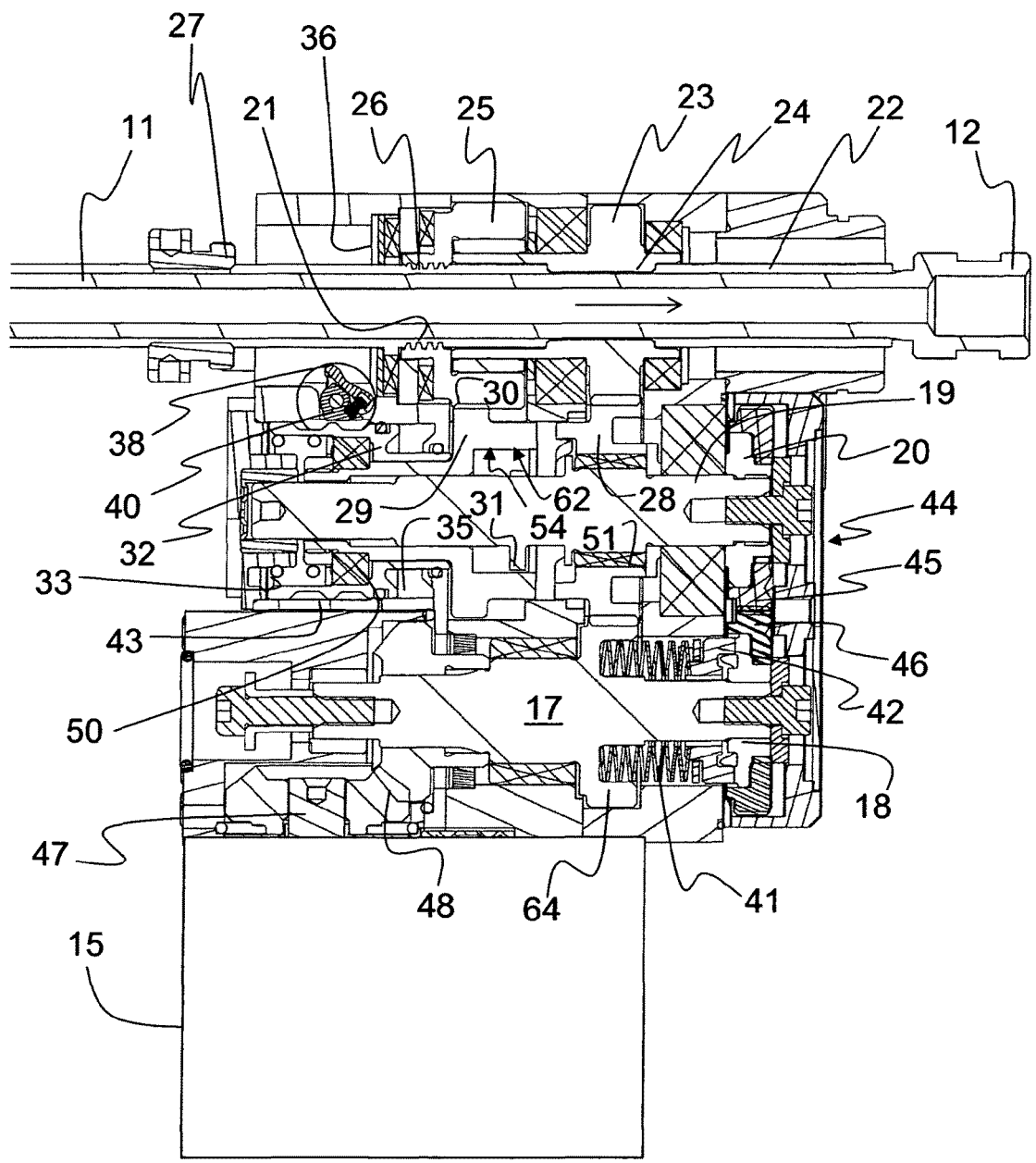
FIG. 2 shows a detailed view of the power tool shown in FIG. 1 in a first operational position.

(1) Normal Drilling (FIG. 2)

During the normal drilling operation shown in FIG. 2 drilling is performed wherein the spindle 11, which at its front end includes a socket 12 that holds the drill bit (not shown). During the normal drilling phase, the spindle 11 is advanced, i.e. axially translated to the right in the figure, at the same time as the spindle 11 is rotated to create the drilling movement.

The spindle 11 comprises an external tread 21 that extends over substantially the whole length of the spindle 11. Further, the spindle 11 comprises at least one external axial groove 22, which extends axially over substantially the whole length of the spindle 11, such that the thread 21 is axially interrupted by said groove 22.

A drive gear 23 is arranged to drive the rotation of the spindle. The drive gear 23 includes an internal axial projection 24 that fits inside the axial groove 22 on the spindle 11, such that mutual axial movement is possible between the spindle 11 and the drive gear 23, but such that no mutual rotational movement is allowed between them.

Further, a feed gear 25 with an internal threading 26 is in threaded engagement with the external threads 21 on the spindle 11. A stop ring 27 is fixedly arranged at the left, rear end of the spindle 11.

The drive gear 23 is drivingly connected to the motor 13 so as to rotate at a substantially constant speed throughout the operation of the tool. Specifically, the second gear shaft 17 is driven by the motor output shaft 16 via an angular bevelled coupling 48 and an output shaft 47 of the gear box 15. Further, the second gear shaft 17 is arranged to drive an intermediate drive gear 28 via fixed coupling 64. The intermediate drive gear 28 is mounted on a bearing 51 around the first gear shaft 19, such that it may rotate freely with respect to said first gear shaft 19. The intermediate drive gear 28 is further coupled via a gear transmission, e.g. a toothed engagement, to the drive gear 23 in order to drive the spindle.

As indicated above, the complete coupling from the motor output shaft 16 to the drive gear 23 remains unchanged under the whole operation, such that the drive gear 23 and hence the spindle 11 will rotate at a constant speed during the complete operation. The rotational speed is defined by the motor 13 and the gear ratio of the gear box 15, and is normally set between 500 and 4 000 rpm. With the inventive construction, the rotational speed of the spindle 11 may be as high as 12 000 rpm. The high rotational speed is allowed due to the inventive feed gear arrangement, which is further described below.

The feed gear 25 is drivingly and interchangeably connectable to the motor 13 via a first and a second gear connection. Both these gear connections are achieved by one single intermediate feed gear 29, which is interposable along the first gear shaft 19 between two different gear positions. In both of these gear positions the intermediate feed gear 29 is coupled to the feed gear 25 via the same outer gear transmission 30.

In FIG. 2, the intermediate feed gear 29 is positioned in the first of these positions, which corresponds to the first gear position. In this first gear position the intermediate feed gear 29 is coupled via an inner gear transmission 31 to the first gear shaft 19. The gear ratio is such adapted in the this first gear position that the feed gear 25 will rotate slightly faster than the drive gear 23, such that the spindle 11 will be advanced when the intermediate feed gear 29 is positioned in the first gear position.

The inside surface of the intermediate feed gear 29 comprises a toothed section 62 that completes the inner gear transmission 31 to the first gear shaft 19. Inside of this toothed section 62, i.e. to the left in the figure, the intermediate feed gear 29 comprises an inner blank section 54 adapted not to engage with first gear shaft 19. Hence, when the intermediate feed gear 29 is translated towards the second of its two different positions, which corresponds to the second gear position, i.e. to the right in the figure, the engagement to the first gear shaft 19 will be released. This is further described below with reference to FIG. 4.

The different gear ratios from the second gear shaft 17 to the first gear shaft 19 and to the intermediate drive gear 28, respectively, is such arranged that the first gear shaft 19 rotates faster than the intermediate drive gear 28. The relation between these rotational speeds is indirectly affected by an exchangeable feed cassette 44. The feed cassette 44 includes a primary feed cassette gear 45 and a secondary feed cassette gear 46.

The first gear shaft 19 includes a first coupling 20, which is connected via e.g. a hexagonal connection to the primary feed cassette gear 45. The primary feed cassette gear 45 transmits the rotation from the secondary feed cassette gear 46, which is in turn coupled to the second gear shaft 17 via a second coupling 18 and a clutch sleeve 42.

Hence, the feed cassette 44 governs the relative speed between the first gear shaft 19 and the second gear shaft 17, which indirectly affects the relative speed between the first gear shaft 19 and the intermediate drive gear 28. Further, the relative rotational speed between the gear shafts 17 and 19, may be inversed by arranging the feed cassette in the opposite direction, i.e. with the secondary feed cassette gear 46 connected to the first coupling 20 and the primary feed cassette gear 45 connected to the first coupling 20.

It must however be noted that the relative speed between the drive gear 23 and the feed gear 25 is not only dependent on the relative rotational speed of the first and second gear shafts 17 and 19. As stated above, the direct transmission between the second gear shaft 17 and the intermediate drive gear 28 is such adapted that the intermediate drive gear 28 will rotate at a lower rotational speed than the first gear shaft 19, regardless of the gear ratio achieved by the feed cassette 44.

From this follows that it is possible to control the rate at which the spindle 11 will be advanced during the drilling operation by means of the feed cassette 44. The feed cassette 44 may either be inversed or replaced by another feed cassette with another gear ratio. Other parameters, including the retraction speed, will remain unaffected of the gear ratio of the feed cassette 44, which will be apparent below.

It is normal practice to a person skilled in the art to achieve a desired gear ratio by constructing or adapting the mutual sizes of the gears involved. Therefore, this is not described in detail in this application.

Figure 3:
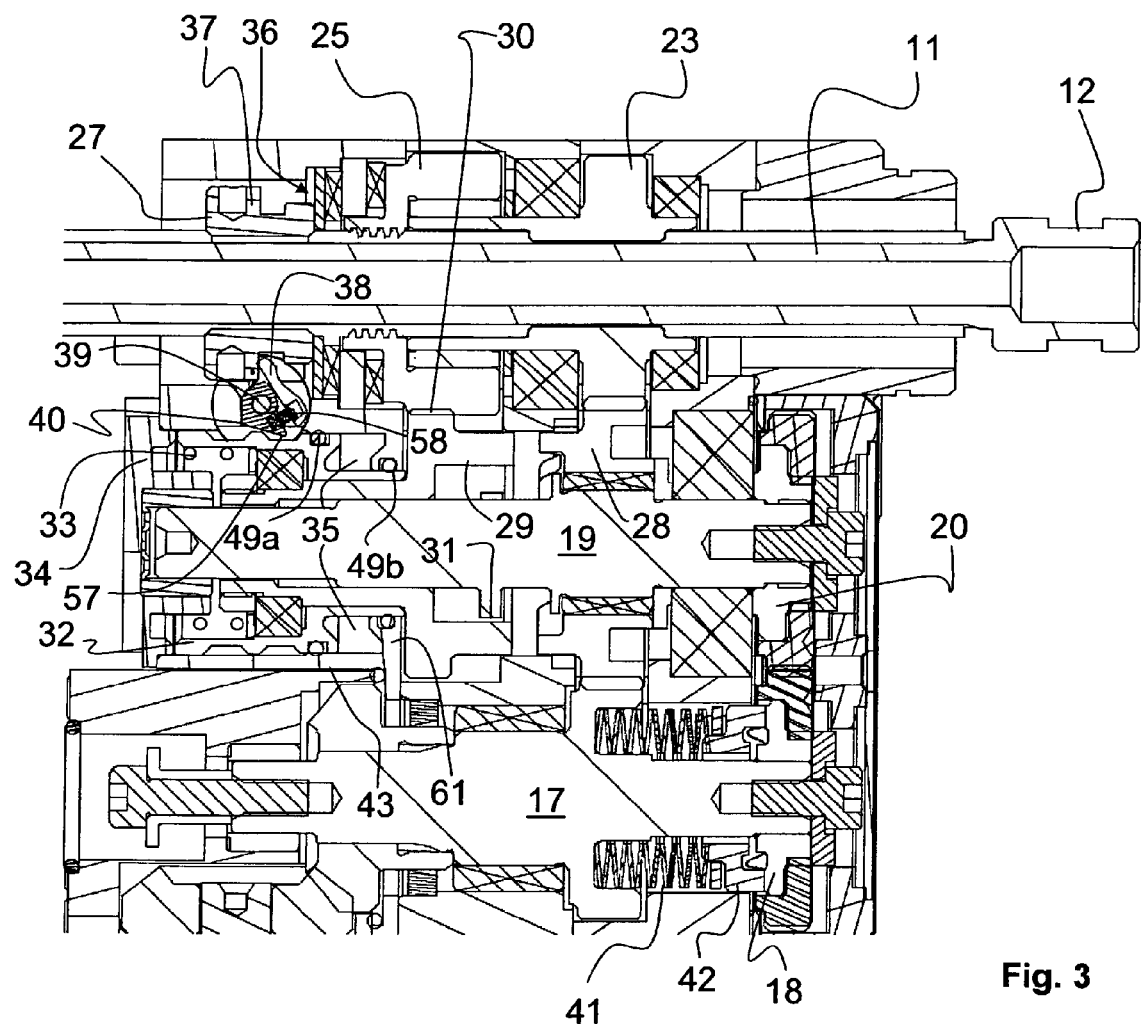
FIG. 3 shows a detailed view of the power tool shown in FIG. 1 in a second operational position.

2. End Phase of Drilling (FIG. 3)

The intermediate feed gear 29 is held in the first gear position by interaction with an axially displaceable cylinder 32. The cylinder 32 is acted on towards the second gear position, i.e. to the right in the figure, by a retraction spring 33 which is interposed between the cylinder 32 and the opposed housing wall 34. The spring force is however overcome by a pneumatic pressure that acts in a chamber 35 on the opposite side of the cylinder 32. This pneumatic pressure is upheld during the whole of the positive feed drilling operation, i.e. for as long as the spindle is advanced. The chamber 35 is sealed by two sealings 49a and 49b, e.g. in the form of O-rings.

The closed chamber 35 is defined by the cylinder 32, a surrounding peripheral housing wall 43 and an annular housing element 61. The first sealing 49a is arranged to seal between the cylinder 32 and the peripheral housing wall 43, and the second sealing 49b is arranged to seal between the cylinder 32 and the annular housing element 61. The chamber 35 is expandable against the action of said spring 33 to push the cylinder 32 towards the first gear position away from the annular housing element 61 by the application of a pneumatic pressure inside said chamber 35.

The cylinder 32 is axially connected to the intermediate feed gear 29 via an axial bearing 50, which assures the axial alignment of the cylinder 32 and the intermediate feed gear 29 but allows the intermediate feed gear 29 to rotate with respect to the cylinder 32. The cylinder 32 is arranged such that it will not rotate with respect to the housing wall 43.

In FIG. 3 the spindle 11 is about to reach the end position of the drilling. A few moments before the spindle 11 reaches its stop position, where the stop ring 27 abuts a positive stop 36, an actuation part 37 of the stop ring 27 reaches a lever 38 of a retaining mechanism 39. The retaining mechanism further includes a one-toothed ratchet 40 which is rotated by the action of the lever 38 such that the tooth 57 of the ratchet 40 will point downwards into an interaction area, i.e. inside the peripheral housing wall 43, in which the tooth 57 will interact with the motion of the cylinder 32.

The ratchet is spring loaded towards an open position, as shown in FIG. 2, in which the tooth 57 is positioned such that it does not reach into the interaction area such that it will not interfere with the cylinder 32. Further, the ratchet 40 is rotatable against the action of a spring 58 towards the lever 38. This allows the cylinder 32 to pass the tooth of the ratchet in the forward direction, i.e. to the right in the figure, such that the shoulder 55 may pass the tooth of the ratchet 40. The function of the retaining mechanism 39 will be more closely described below with reference to FIGS. 4 and 5.

Almost simultaneously as the stop ring 27 abuts the positive stop 36 the operational torque T in the feed gear 25 rises instantaneously. This increased torque will be transmitted via the intermediate feed gear 29, the first gear shaft 19, and the first and second coupling 20 and 18, respectively, to the second gear shaft 17. The coupling between the second gear shaft 17 and the second coupling 18 is achieved by means of a smoothly toothed interaction between the second coupling 18 and a clutch sleeve 42, which are held together by the action of a torque limiting spring 41. The spring 41 acts on the clutch sleeve 42, which is coupled via splines to the second gear shaft 17 and via said smoothly teethed interaction to the second coupling 18. The second coupling 18 is not in rotational engagement with the second gear shaft 17 but may rotate freely with respect to the same. Instead the rotation of the second coupling 18 is governed by its engagement to the clutch sleeve 42.

The spring force of the spring 41 is chosen such that the interaction between the clutch sleeve 42 and the second coupling 18 is broken when the operational torque T exceeds a predetermined advancement threshold value $T_A$. Once this predetermined threshold is exceeded, the connection will skip such that the driving of the feed gear 25 will be interrupted. Further, as soon as the connection will skip, the clutch sleeve 42 will be translated against the action of the spring 41 and away from the second coupling 18, i.e. to the left in the figure, and thereby open a passage (not shown) to release the pressure in the chamber 35. As the pressure in the chamber 35 is relieved the cylinder 32 and the intermediate feed gear 29 will be pushed under the action of the retraction spring 33 towards the second gear position, i.e. to the right in the figure, where the intermediate feed gear 29 engages with the intermediate drive gear 28. This will lead to the start of the retraction phase.

Start of Retraction of Spindle (FIGS. 4a-4b)

As the intermediate feed gear 29 is pushed to the second gear position it will remain coupled to the feed gear 25 via the same outer gear transmission 30. However, it will be disconnected from the inner gear transmission to the first gear shaft 19. This inner gear transmission is lost because instead of the toothed section 62 the inner blank section 54 of the intermediate feed gear 29 will be positioned opposite to the connective protrusion 63 of the first gear shaft 19, such that no interaction is achieved.

Instead, the intermediate feed gear 29 will be coupled to the intermediate drive gear 28. The interaction between the intermediate feed gear 29 and the intermediate drive gear 28 is assured by the action of the retraction spring 33 and is accomplished by means of a smoothly toothed interaction between the intermediate feed gear 29 and the intermediate drive gear 28. The spring action of the retraction spring 33 is moderate and smaller than the action of the torque limiting spring 41.

The intermediate feed gear 29 might get jammed at the final phase of the positive feeding during drilling and the operational torque T needed to loosen the intermediate feed gear 29 may very well be higher than what is possible to uphold by the action of the retraction spring 33 alone.

Therefore, the above mentioned retaining mechanism 39 is provided.

When the spindle 11 is in its most advanced position, i.e. as illustrated in FIGS. 4a and 4b, the one-toothed ratchet 39 is pushed by the action of the stop ring 27 on the lever 38, such that it is rotated around the axis X into its lowermost position. In this lowermost position the tooth 57 of the ratchet 40 will engage a shoulder 55 on the cylinder 32 as it passes under the ratchet due to the action of the retraction spring 33. The ratchet 40 is arranged to allow the cylinder 32 to pass towards engagement with the intermediate drive gear 28.

As is visible in FIG. 4b a support 59 is arranged to interact with a cam profile 60 of the ratchet 40 in order to stop the rotation of the ratchet 40 as it reaches the blocking position. Hence, in the position shown in FIG. 4b the lever 38 is restricted from moving counter clockwise due to its contact with the stop ring 27, and the ratchet 40 is restricted from moving clockwise due the contact between the cam profile 60 of the ratchet 40 and the support 59.

However, the spring 58 between the lever 38 and the ratchet 40 allows the ratchet 40 to be slightly rotated counter clockwise such that the shoulder 55 of the cylinder 32 may pass the tooth 57 of the ratchet 40 towards the second gear position, i.e. from the position shown in FIG. 3 into the position shown in FIGS. 4a and 4b.

In the position shown in FIGS. 4a and 4b, where engagement is accomplished between the intermediate feed gear 29 and the intermediate drive gear 28, the cylinder 32 will be blocked by the engagement between the tooth 57 of the ratchet 40 and the shoulder 55. This engagement will restrict the intermediate feed gear 29 from moving out of its engagement with the intermediate drive gear 28. Hence, even if the feed gear 25 is jammed to the spindle 11 such that the axial force produced in the smoothly toothed engagement between the intermediate feed gear 29 and the intermediate drive gear 28 exceeds the force exerted by the spring 33, the engagement between the intermediate feed gear 29 and the intermediate drive gear 28 will be held intact, such that the feed gear 25 and the spindle 11 will be loosened and such that the retraction of the spindle 11 will be commenced.

It is to be noted that even though the intermediate feed gear 29 will be coupled to the intermediate drive gear 28 such that they rotate at the same rotational speed, the feed gear 25 will rotate at a lower rotational speed than the drive gear 23. This is due to the fact that the gear ratio from the intermediate feed gear 29 to the feed gear 25 is different from the gear ratio from the intermediate drive gear 28 to the drive gear 23. It may be noted in FIG. 4a that the feed gear 25 has a slightly larger diameter than the drive gear 23. From this naturally follows that the rotational speed of the feed gear 25 will be lower than the rotational speed of the drive gear 23.

Further, of course, said difference in rotational speed between the feed gear 25 and the drive gear 23 will force the spindle 11 to be retracted, i.e. translated to the left in the figure.

Retraction Phase (FIG. 5)

FIG. 5 shows a part of the power tool during the retraction phase. FIG. 5 shows a more detailed view of the retaining mechanism 39 than the other figures.

During the first part of the retraction phase the front end 53 of the stop ring 27 will interact with the lever 38 of the retaining mechanism 39, such that the ratchet 40 will be raised and such that the tooth 57 on the ratchet 40 will no longer point downwards into the interaction area, where it engages the shoulder 55 of the cylinder 32 to block the intermediate feed gear 29 in the second gear position. The spring action of the retraction spring 33 will however be enough to withhold the interaction between the intermediate feed gear 29 and the intermediate drive gear 28 at this point, since the spindle has been loosened from the jammed position, whereby the retracting of the spindle 11 may be concluded at a relatively low torque.

End of Retraction (FIG. 6)

The retraction of the spindle 11 is concluded when the back part of the socket 12 on the spindle 11 abuts the drive gear 23. At this point and due to this interaction, the operational torque T will increase on the feed gear 25. The increase in torque will be sensed in the coupling between the intermediate feed gear 29 and the intermediate drive gear 28, such that the interaction in this coupling will be lost and the intermediate feed gear 29 and the cylinder 32 will be intermittently pushed against the action of the retraction spring 33, i.e. to the left in the figure. At this point the ratchet 40 is located such that its tooth 57 will not reach into the interaction area where it may otherwise interfere with the shoulder 55 on the cylinder 32.

As indicated above the spring action of the retraction spring 33 is moderate and smaller than the action of the torque limiting spring 41, which yields that the retraction threshold torque value $T_R$ is lower than the advancement threshold torque value $T_A$. Thereby, the engagement between the clutch sleeve 42 and the coupling 18 will override, i.e. be stronger than, the engagement between the intermediate drive gear 28 and the intermediate feed gear 29.

This is important because it is the engagement between the clutch sleeve 42 and the coupling 18 that will indirectly drive both the drive gear 23 and the feed gear 25 at the restart of the drilling operation, after concluded retraction. Hence, the spring action of the torque limiting spring 41 is set such that it will be enough to loosen the spindle 11 from its initial, retracted position. Just how hard the spindle 11 is jammed in its initial position is governed by the spring action of the retraction spring 33, as it is this spring action that is overcome and concludes the retraction when the operational torque T exceeds the retraction threshold torque value $T_R$ during the retraction phase.

The movement of the cylinder 32 as the spring action of the retraction spring 33 is overcome uncovers a valve located in the housing wall 43 around the first gear shaft 19. This is sensed by the control unit of the power tool, which thereby concludes the drill operation and closes the main valve 14 (shown only in FIG. 1).

Above, the invention has been described with reference to specific embodiments. The invention is however not limited to either of these embodiments. Instead the scope of the invention is defined by the following claims.

The invention claimed is:

1. A drive arrangement in a pneumatic power tool which includes a pneumatic motor, said drive arrangement comprising:
   a spindle for mounting a cutting element, said spindle being drivingly connected to said pneumatic motor and said spindle externally including a thread and an axial groove;
   a drive gear for driving a drive rotation of said spindle, said drive gear being engaged with the axial groove on said spindle and being drivingly connected to the pneumatic motor so as to rotate at a constant rotational speed with respect to a motor output shaft; and
   a feed gear threaded upon said spindle, said feed gear being rotatable with respect to the spindle to advance and retract said spindle, and said feed gear being driven by an intermediate feed gear which is interchangeably drivingly connectable to the pneumatic motor via a first and a second gear connection, respectively;
   wherein the intermediate feed gear is arranged to drive the feed gear at a slightly higher rotational speed than the constant rotational speed of the drive gear so as to advance the spindle with respect to the feed gear in the first gear connection, and to drive the feed gear at a lower rotational speed than the constant rotational speed of the drive gear so as to retract the spindle with respect to the feed gear in the second gear connection, and
   wherein an intermediate drive gear is drivingly connected to the pneumatic motor and journalled around a first gear shaft to rotate freely with respect to the first gear shaft, said intermediate drive gear being in toothed engagement with the drive gear, and said intermediate feed gear being in toothed engagement with the feed gear and lodged to slide coaxially along said first gear shaft between a first gear position in which it is engaged to the first gear shaft and a second gear position in which it is engaged to the intermediate drive gear, and wherein the first and second gear position of the intermediate feed gear correspond to the first and second gear connection, respectively.

2. The drive arrangement according to claim 1, wherein a second gear shaft is arranged to drive the intermediate drive gear via a direct engagement, and to drive the first gear shaft via separate coupling parts, and wherein the first gear shaft is arranged to rotate at a higher rotational speed than the intermediate drive gear.

3. The drive arrangement according to claim 2, wherein the separate coupling parts comprise a clutch sleeve which is rotationally engaged to the second gear shaft and lodged to slide coaxially along the second gear shaft, wherein the clutch sleeve is spring loaded by a torque limiting spring with a spring action $(F_A)$ towards a smoothly toothed engagement with a second coupling that, in turn, is drivingly engaged with a first coupling of the first gear shaft, and wherein said smoothly toothed engagement is broken if a torque (T) acting between the clutch sleeve and the second coupling exceeds a value of a threshold torque $(T_A)$ defined by the spring action $(F_A)$ on the clutch sleeve.

4. The drive arrangement according to claim 3, wherein the driving engagement between the first coupling and the second coupling is achieved by an exchangeable feed cassette including a primary feed cassette gear and an interconnected secondary feed cassette gear, and wherein a first gear ratio may be achieved by engaging the primary feed cassette gear to the first coupling and the secondary feed cassette gear to the second coupling, and a second different gear ratio may be achieved by engaging the primary feed cassette gear to the second coupling and the secondary feed cassette gear to the first coupling.

5. The drive arrangement according to claim 3, wherein a retraction spring is arranged to push the intermediate feed gear into the second gear position in which it is engaged with the intermediate drive gear, and wherein a pneumatic pressure is arranged in a sealed chamber to act in an opposite direction on the intermediate feed gear to push the intermediate feed gear into the second first gear position in which the intermediate feed gear is engaged with the first gear shaft and not with the intermediate drive gear, said pneumatic pressure being adapted to override the action of the retraction spring when applied.

6. The drive arrangement according to claim 5, wherein the clutch sleeve is pneumatically connected to the sealed chamber in such a way that a movement of the clutch sleeve when it slides against the action of the torque limiting spring and its smoothly toothed engagement with the second coupling part is broken, will release the pressure in the sealed chamber, whereby the intermediate feed gear will slide out of the first gear position in which it is engaged with the first gear shaft and into the second gear position in which it is engaged with the intermediate drive gear.

7. The drive arrangement according to claim 6, wherein the intermediate feed gear is axially connected to a cylinder via a bearing, said cylinder being lodged to slide coaxially along the first gear shaft and is acted on by the retraction spring and in an opposite direction by the pressure in the sealed chamber, and wherein an axial position of the intermediate feed gear is directly governed by a position of the cylinder and indirectly by the action of the retraction spring and the pressure in the sealed chamber acting on the cylinder.

8. The drive arrangement according to claim 7, wherein the engagement between the intermediate feed gear and the intermediate drive gear is achieved by a smoothly toothed engagement which is held together by the action of the retraction spring.

9. The drive arrangement according to claim 8, wherein a retaining mechanism is arranged to restrict the intermediate feed gear from moving out of the engagement to the intermediate drive gear during an initial phase of the retraction of the spindle.

10. The drive arrangement according to claim 8, wherein the position of the cylinder is pneumatically connected to a control unit of the tool, and wherein the cylinder produces a pneumatic signal to the control unit to interrupt an operation when the smoothly toothed engagement between the intermediate feed gear and the intermediate drive gear is broken and the cylinder slides against the action of the retraction spring.

11. The drive arrangement according to claim 10, wherein the control unit sends a signal to close a main valve of the tool in response to an order to interrupt the operation.

12. The drive arrangement according to claim 1, wherein a retraction spring is arranged to push the intermediate feed gear into the second gear position in which it is engaged with the intermediate drive gear, and wherein a pneumatic pressure is arranged in a sealed chamber to act in an opposite direction on the intermediate feed gear to push the intermediate feed gear into the first gear position in which the intermediate feed gear is engaged with the first gear shaft and not with the intermediate drive gear, said pneumatic pressure being adapted to override the action of the retraction spring when applied.

13. A pneumatic power tool, comprising a pneumatic motor and the drive arrangement according claim 1.

* * * * *